United States Patent
Singh et al.

(10) Patent No.: US 7,526,607 B1
(45) Date of Patent: Apr. 28, 2009

(54) NETWORK ACCELERATION AND LONG-DISTANCE PATTERN DETECTION USING IMPROVED CACHING AND DISK MAPPING

(75) Inventors: Amit P. Singh, Los Altos, CA (US); Balraj Singh, Los Altos, CA (US); Vanco Burzevski, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 681 days.

(21) Appl. No.: 11/233,357

(22) Filed: Sep. 22, 2005

Related U.S. Application Data

(60) Provisional application No. 60/613,144, filed on Sep. 23, 2004.

(51) Int. Cl.
*G06F 12/00* (2006.01)
(52) U.S. Cl. .................. 711/118; 711/136; 711/137; 711/160; 711/216
(58) Field of Classification Search .................. None
See application file for complete search history.

(56) References Cited

U.S. PATENT DOCUMENTS 6,856,651 B2  2/2005  Singh

2001/0047466 A1 * 11/2001 Topham ................ 712/226
2002/0071438 A1  6/2002 Singh

OTHER PUBLICATIONS

N. Spring and D. Wetherall, "A Protocol-Independent Technique for Eliminating Redundant Network Traffic," ACM SIG Comm 2000, pp. 87-95, Stockholm, Sweden, Aug. 2000.
U.S. Appl. No. 11/303,744, entitled "Transparent Caching of Repeated Video Content in a Network," filed Dec. 16, 2005.

* cited by examiner

*Primary Examiner*—Reginald G Bragdon
*Assistant Examiner*—Shawn X Gu
(74) *Attorney, Agent, or Firm*—Shumaker & Sieffert, PA

(57) ABSTRACT

A compression device recognizes patterns of data and compressing the data, and sends the compressed data to a decompression device that identifies a cached version of the data to decompress the data. In this way, the compression device need not resend high bandwidth traffic over the network. Both the compression device and the decompression device cache the data in packets they receive. Each device has a disk, on which each device writes the data in the same order. The compression device looks for repetitions of any block of data between multiple packets or datagrams that are transmitted across the network. The compression device encodes the repeated blocks of data by replacing them with a pointer to a location on disk. The decompression device receives the pointer and replaces the pointer with the contents of the data block that it reads from its disk.

37 Claims, 7 Drawing Sheets

NETWORK ACCELERATION AND LONG-DISTANCE PATTERN DETECTION USING IMPROVED CACHING AND DISK MAPPING

This application claims the benefit of U.S. Provisional Application Ser. No. 60/613,144, filed Sep. 23, 2004, the entire content of which is incorporated herein by reference.

TECHNICAL FIELD

The invention relates data compression and, more particularly, to using disk mapping and data caching for compressing data.

BACKGROUND

An important goal of conventional communication systems is to improve the bandwidth and throughput of data. Conventional systems may use a compression device and a decompression device to reduce network traffic transmitted from a source to a destination. The compression device uses a compression algorithm to compress or encode the data by detecting in the data flows patterns of data that has previously been transmitted, and replacing the patterns with a token or label instead of retransmitting the data. The encoded or compressed data generally contains the same information as the original data but requires fewer bits to be stored or transmitted. The decompression device receives the encoded data and reconstructs the original data based on the token. The encoding or compression process is referred to as a loss-less process if the original data can be exactly recovered from the encoded or compressed data.

SUMMARY

In general, principles of the invention relate to detection of repeated information transfers to reduce an amount of high bandwidth traffic transmitted across a network. In particular, the invention relates to a compression device capable of recognizing patterns of data and compressing the data, and sending the compressed data to a decompression device that identifies a cached version of the data to decompress the data. In this way, the compression device does not have to resend the high bandwidth traffic over the network. The network may comprise any private or public network, such as the Internet.

For example, the invention may utilize a compression device connected to a video server, to communicate across a Wide Area Network (WAN) with a decompression device located at subscriber networks that include subscriber devices. Both the compression device and the decompression device cache the data in packets they receive. Each device has a disk, on which each device writes the data in the same order. The compression device looks for repetitions of any block of data between multiple packets or datagrams that are transmitted across the network. The compression device encodes the repeated blocks of data in a more efficient format for transmission to the decompression device by replacing them with a pointer to a location on disk of the contents of that data block. The decompression device receives the pointer and replaces the pointer with the contents of the data block that it reads from its disk. The decompression device then transmits the data to its destination in the same form that it was received by compression device. In this manner, the amount of traffic sent between compression device and decompression device may be reduced. The compression and decompression devices may communicate in a manner that is transparent to the video server and the subscriber devices.

In one embodiment, a method comprises maintaining a cache within a compression device, wherein the cache includes a plurality of cache lines and each of the cache lines is associated with a packet flow identifier, receiving a packet with the compression device, assigning a flow identifier to the packet, selecting one of the cache lines of the cache based on the flow identifier, and writing the packet to the selected cache line.

In another embodiment, a device comprises a disk that stores data, a memory that stores a subset of the data stored on the disk, and a disk map module. The disk map module receives a packet, writes the packet to the memory, generates signatures for data in the packet, searches a hash table for signatures that match the generated signatures, replaces patterns of data in the packet with pointers that define locations of the data, and transmits the pointers to a decompression device when a pattern of data in the received packet is the same as a pattern of data on the disk.

In another embodiment, a system comprises a compression device having a storage medium of data previously received by the compression device and a cache storing at least a portion of the data and a decompression device having a storage medium of data previously received by the decompression device and a cache storing at least a portion of the data. Each of the caches includes a plurality of cache lines and each of the cache lines is associated with a packet flow identifier. The compression device and the decompression device further assign a flow identifier to a received packet and write the packet to a cache line selected based on the flow identifier.

In another embodiment, a computer-readable medium comprises instructions for causing a compression device to maintain a cache within the compression device, wherein the cache includes a plurality of cache lines and each of the cache lines is associated with a packet flow identifier. The compression device further receives a packet, assigns a flow identifier to the packet, selects one of the cache lines of the cache based on the flow identifier, and writes the packet to the selected cache line.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
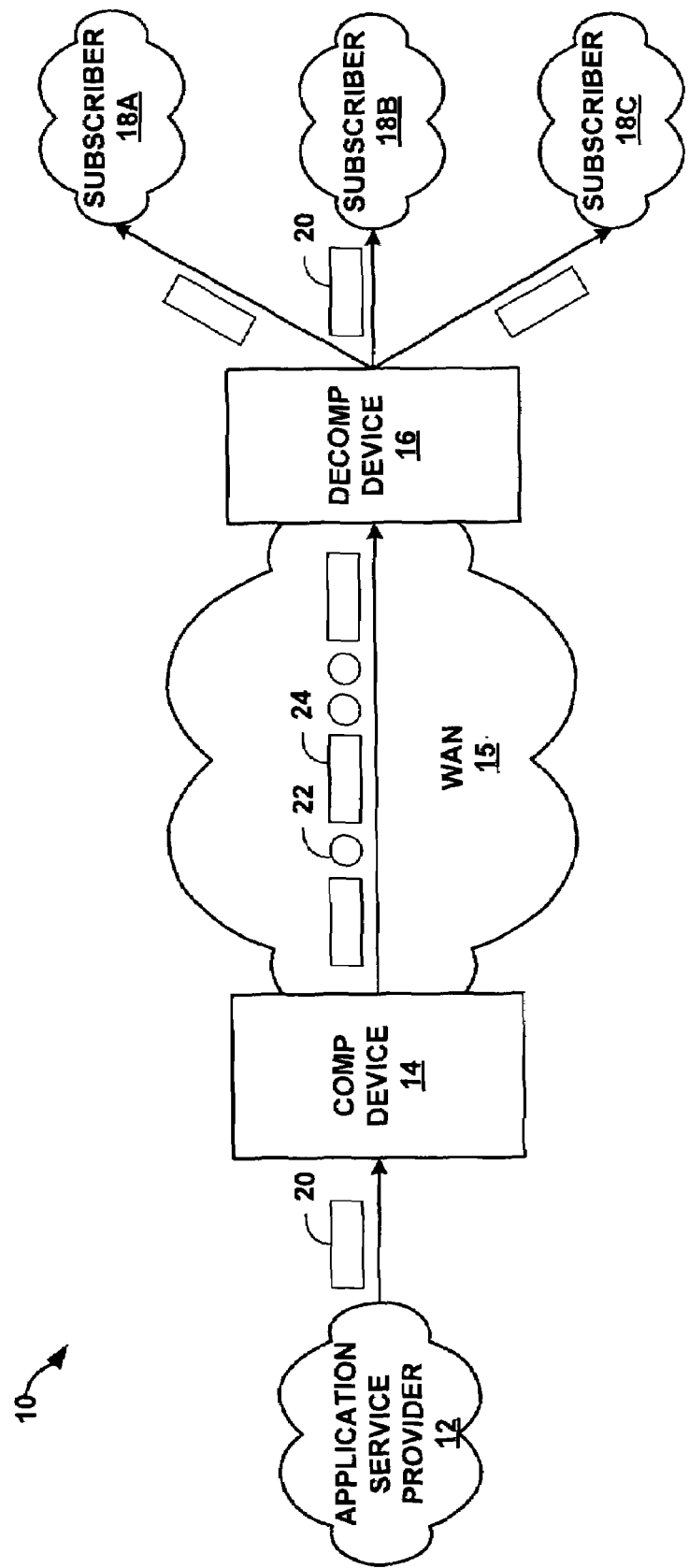
FIG. 1 is a block diagram illustrating an exemplary data compression system.

FIG. 1 is a block diagram illustrating an exemplary data compression system 10. In the example embodiment, system 10 includes an application service provider network 12 connected to a compression device ("COMP DEVICE" in FIG. 1) 14 on one side of a Wide Area Network (WAN) 15. Application service provider 12 provides services to subscriber networks 18A-18C (collectively, "subscribers 18"). For example, application service provider 12 may provide multimedia services, e.g., video delivery services, to subscribers 18.

A decompression device ("DECOMP DEVICE" in FIG. 1) 16 is located on the same side of WAN 15 as subscribers 18. Compression device 14 and decompression device may operate synchronously to provide real-time compression and decompression of network traffic sent from application service provider 12 to subscribers 18 over WAN 15.

In accordance with the principles of the invention, compression device 14 and decompression device 16 store the received data packets using novel caching and disk-mapping techniques. In general, each of compression device 14 and decompression device 16 utilizes internal storage media, e.g. in-memory caches and disk drives, to store the data, and each device writes the data to the storage media in substantially the same manner.

For example, as compression device 14 receives packets 20 from application service provider 12, the compression device 14 detects repeated patterns contained in the packets and encodes the patterns with labels. The labels contain references (e.g., pointers) that indicate locations of the same data previously cached and stored within compression device 14. Moreover, because compression device 14 and decompression device 16 cache and store the data in substantially the same manner using the techniques described herein, the labels similarly reference the locations of the data stored within decompression device 16. Instead of transmitting the repeated pattern, compression device 14 sends labels 22 along with other uncompressed packets 24 across WAN 15 to decompression device 16. Decompression device decodes the labels 22 and reproduces the original packets 20 by accessing the data on its internal storage media using the labels, and then sends the reproduced packets to subscribers 18 in accordance with their destination information.

In another embodiment, compression and decompression functions may be integrated into the same physical device or box. In this embodiment, both devices may reside on either side of WAN 15, and compressed traffic may be sent in both directions. Caching and disk map functions for both directions may be shared, such that the data learned in one direction can be reused for compression and decompression in the reverse direction on the same link. In a further embodiment, a single compression device may operate synchronously with multiple decompression devices at different locations across WAN 15. Similarly, a single decompression device may operate synchronously with multiple compression devices deployed at different locations around WAN 15.

Hence, in the example illustrated in FIG. 1, the region of the network that experiences an improved level of efficiency of data transport is WAN 15. In most cases, a WAN communication link is the most expensive component of a network, and hence the component that is experiencing the maximum demand of bandwidth. Therefore, the invention can be used to increase the efficiency of data transport across WAN 15 by encoding each WAN packet in a more efficient and smaller format.

The invention can encode and encapsulate data and decode and decapsulate data at any point in the network. As mentioned above, FIG. 1 illustrates the use of the invention across the WAN segment 15 of the network. The physical transmission medium and the communication protocols used in the WAN are often different from those used by a local area network (LAN) such as application service provider 12. Since the invention encapsulates the encoded packets before transmission, it can reside on either the WAN or the LAN interface. For instance, in FIG. 1, even though the invention is optimizing traffic across WAN 15, the compression device 14 can be placed on the LAN side just before the LAN-to-WAN edge router or other edge device that converts the LAN packets into the correct format for transmission across the WAN. In this case, all packets that are destined to go to this edge device will first be transmitted through compression device 14. Similarly the decompression device 16 of the invention can, in this case, reside on the LAN side immediately after the WAN-to-LAN edge device. Hence, both compression device 14 and decompression device 16 are actually deployed within the LAN though they are processing only traffic that is destined to travel across WAN 15. In the case that the invention is designed to reside within the LAN, the actual location of the invention in the LAN can vary depending of the architecture of the network. The compression device 14 can reside anywhere within the LAN as long as the packets of data that need to be encoded can reach compression device 14. Similarly, the decompression device 16 can reside anywhere within the LAN, as long as the encoded packets can be sent to decompression device 16 for decoding, and decompression device 16 can transmit the decoded packets to their destination.

Since all encoded packets must be decoded by a decompression device 16, compression device 14 must guarantee that any packets that it encodes can be correctly decoded by the corresponding decompression device 16. In order to provide this guarantee, in some embodiments a synchronization mechanism is used between the compression device 14 and decompression device 16 to ensure that the encoding and decoding algorithms are correctly synchronized. An example of such a synchronization system is described below.

In one embodiment, compression device 14 receives packets for transmission at the connection-less network layer (i.e., layer 3). In this embodiment, compression device 14 encodes each layer 3 packet or datagram and encapsulate the encoded packet in a communication tunnel that is destined specifically for the corresponding decompression device 16. The encapsulation can be performed by any encapsulation protocol that ensures that the encoded packets will be routed to the corresponding decompression device 16. Some of the possible encapsulation protocols include Transmission Control Protocol (TCP), User Datagram Protocol (UDP), and Internet Protocol (IP)-in-IP.

The choice of encapsulation protocol may influence the encoding technique that is used to encode each packet. For instance, if a reliable transport protocol such as TCP is used to encapsulate each encoded packet, then the encoding algorithm need not be explicitly synchronized with the decoding algorithm on decompression device 16. On the other hand, if a non-reliable protocol such as UDP is used to encapsulate the encoded packets, then the encoding algorithm will require a separate reliable synchronization channel with decompression device 16 to ensure that all encoded packets are correctly decoded. The reason for this difference is that when a reliable transport protocol, such as TCP, is used for encapsulation, the compression device 14 and decompression device 16 can be guaranteed that there will be no data loss between them and that the order of processed packets leaving the compression device 14 will the same as the order in which they are delivered (from TCP) at the decompression device 16. Under these conditions it is possible for a corresponding pair of compression and decompression devices to ensure that their encoding and decoding algorithms are synchronized based on the fact that the state of each algorithm is deterministically computed as a function of the data that is processed. Hence, if the encoding and decoding algorithms have the same synchronization parameters and they are given exactly the same data to process in the same order, then they will always maintain the same synchronization state. On the other hand, if there is the possibility of data loss or data re-ordering during transmission of encoded data from compression device 14 and decompression device 16 (e.g., if UDP is used to encapsulate the encoded packets) then the invention can use a separate synchronization channel to explicitly ensure that decompression device 16 is synchronized with the compression device 14 and can accurately decode all of the encoded data it receives.

Figure 2:
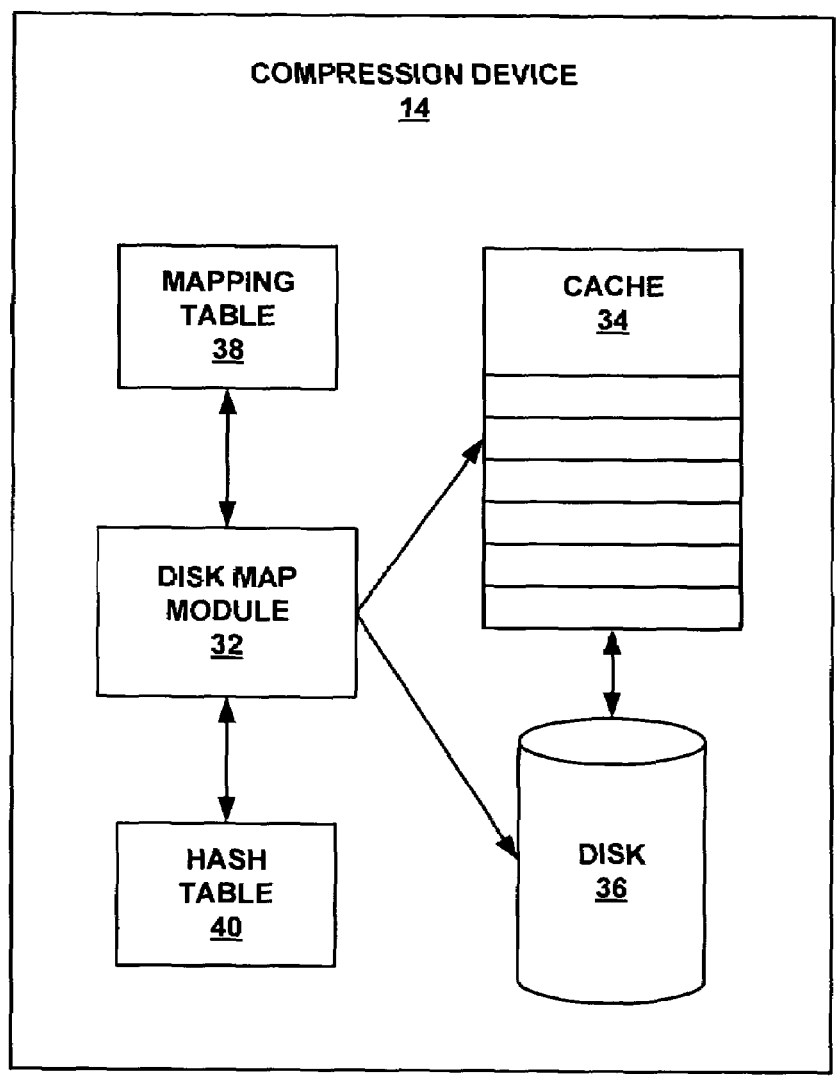
FIG. 2 is a block diagram illustrating an exemplary embodiment of a compression device.

FIG. 2 is a block diagram illustrating an exemplary embodiment of a compression device 14 that compresses packets in accordance with the principles of the invention. In the exemplary embodiment of FIG. 2, compression device 14 includes a disk map module 32 that maintains cache 34, disk 36, mapping table 38, and hash table 40 for storing and retrieving data. Although described with respect to compression device 14, it is to be understood that decompression device 16 may include identical or substantially similar components.

In general, when compression device 14 receives a packet, it writes the data contained in the packet to a buffer. When it later receives another packet, it may search the buffer to determine whether it has already seen a pattern of the same data. As the size of the buffer to be searched increases, the buffer may need to be maintained on disk-based storage rather than in a random access memory (RAM) or other memory-based storage. For instance, if the buffer size is in the range of hundreds or thousands of Gbytes, it may become cost prohibitive to store all of the data within RAM. Hence, the search buffer may be maintained on disk 36.

Since disk access speeds are orders of magnitude lower than memory access speed, rapidly searching a large amount of data on disk 36 in real-time may be a significant challenge. Disk access times include both "seek time," which is the time required to move a disk head to the right location on a disk platter, and "read/write time," which is the time required to actually read or write the data at this location. Seek times for most hard disk systems may be in the range of milliseconds, which is a significant amount of delay for real-time WAN traffic. Hence, in order to support real-time access to the disk at WAN speeds, specific techniques are used to minimize the amount of searches performed on disk 36.

One embodiment of the invention uses a disk map module 32 to cache specific regions of disk 36 into a memory-based cache 34. Cache 34 may, for example, be located within a physical memory provided by compression device and accessible by disk map module 32.

For any access to disk 36, disk map module 32 loads into cache 34 the data from the specified location of disk 36 as well as additional data that is adjacent to this location in disk 36. This is done based on the expectation that if a pattern was found or expected at a specific location on disk 36, then some time in the near future the compression device may perform additional searches for patterns located close (in time and in storage proximity) to this first location. Thus, by loading these adjacent regions of disk 36 into memory, these future searches can be performed in cache 34, thus avoiding having to go to disk 36 and incur an additional disk seek and read delay.

Disk map module 32 also allocates regions of disk 36 into logical regions for different decompression systems. Compression device 14 may operate synchronously with multiple decompression devices. In this case, compression device 14 may allocate the available disk space of disk 36 to logically different decompression devices. For example, disk mapping module divides disk 36 into blocks, so that individual blocks may be dynamically allocated to different decompression tunnels for communication data through WAN 15. By logically dividing disk 36 into blocks of fixed size, compression device 14 first places all blocks into a First In First Out (FIFO) queue and allocates new blocks to individual decompression devices based on demand. Once all blocks have been allocated to different decompression tunnels, a request for a new block is met by simply taking the last block on the FIFO queue and reallocating it to the requesting tunnel. In this manner, compression device 14 automatically ensures that decompression tunnels transmitting more data get more disk blocks, while others that are transmitting less data get fewer blocks of the disk. In one embodiment, the disk block size may be chosen as 64 Mbytes. In other embodiments, the disk block size may be 128 Mbytes, 256 Mbytes, or some other size.

Although FIG. 2 is illustrated with respect to compression device 14, decompression device 16 generally contains the same or similar components and operates in a similar manner. However, the allocation of disk blocks on decompression device 16 may be more complex than on compression device 14. When a previously allocated disk block is re-allocated and re-used on decompression device 16, the corresponding compression device 14 on the other side of WAN 15 for this disk block needs to be informed that this disk block can no longer be used for compression purposes. This may be necessary to ensure that any references by compression device 14 can be correctly de-referenced by decompression device 16. In one embodiment, this is addressed by putting all of the disk blocks on decompression device 16 into a disk-block queue, where new disk blocks are added to the head of the queue and old disk blocks are taken off the tail of the queue. With this data structure, decompression device ensures that any disk block that gets pushed back to within some number N disk blocks from the tail of the queue is marked as no longer usable. Thus, as a disk block on decompression device 16 nears the tail of the queue, the relevant compression device 14 is informed in advance to no longer use this disk block for compression. The number of disk-blocks in advance that this message is sent from decompression device 16 may be determined based on the maximum delay across the network and the rate at which the disk blocks are being used by decompression device 16.

This technique may ensure that the entire disk is proportionately distributed to different compression and decompression tunnels based on demand, rather than having to distribute these blocks uniformly in advance. This technique also ensures that compression and decompression devices synchronize which disk blocks are currently available for use on both devices. This synchronization process can also be reinitiated whenever any two devices first set up their compression/decompression tunnels. In other words, the two devices can go through their list of existing disk blocks to determine which blocks are currently owned by the peer device on the other end, and then synchronize this information before starting compression and decompression.

Thus, by ensuring that all packets are processed in the same order and in the same manner on both devices, the data within each disk block will be exactly the same on both the compression and decompression devices. This is done by ensuring that the processed data transmitted from compression device 14 is received in the same order and without any loss on decompression device 16. Hence, the data written to each disk block by the compression and decompression devices will be exactly the same. In another embodiment, this process could be replaced by a more explicit scheme where each packet is tagged with a unique number and decompression device 16 sends acknowledgements and/or negative acknowledgements to compression device 14 to indicate if the data is received in order and without loss. If this does not occur, compression device 14 could either resend the missing data or mark those regions of disk 36 as non-accessible.

Disk map module 32 also provides an interface to create new disk blocks as needed by the compression or decompression devices. A separate disk map module 32 may be maintained by each of compression device 14 and decompression device 16, even where both devices may be running on the same box. As a new disk block is requested, the disk block at the tail of the disk block queue is removed and added to the head and assigned to the requesting tunnel. A unique tunnel ID is maintained for each tunnel and stored within the disk block. If the disk map module 32 is performing this function running on decompression device 16, then removing a disk block from the tail will result in some other disk block in the disk block queue falling within the distance threshold at which it is classified as no longer usable, as explained above. Hence, the compression device 14 that is associated with this disk block at the other side of WAN 15 is informed that this disk block should no longer be used for compression.

In one embodiment, disk map module 32 divides each of the disk blocks in disk 36 into cache lines of fixed size. As one example, the cache line size may be chosen as 64 Kbytes. Disk map module 32 may also pre-allocate enough physical memory to store a fixed number of cache lines in cache 34. In one example embodiment, cache 34 may contain 4096 cache lines of 64 Kbytes each to create a 256 Mbyte cache. Disk map module 32 may perform all read or write accesses to disk 36 at the cache line granularity. In this case, if a sequence in location L needs to be read from disk 36, disk map module 32 may load the entire 64 k region of disk 36 within which location L exists from disk 36 to cache 34. In effect, this divides disk 36 into lines of 64 Kbytes each, and disk reads/writes are performed on complete cache lines.

In order to know which lines are currently in cache 34, disk map module 32 maintains a mapping table 38 for all lines of disk 36. Mapping table 38 may be designed simply as a table including only a few bytes per line that specify whether the line is currently in cache 34, and if so, at what location in cache 34. Disk map module 32 could also break down the lines into smaller pages (e.g., if the page size is 4 Kbytes, then there will be 16 pages per line). This allows disk map module 32 to load and write regions from disk 36 at page boundaries rather than line boundaries.

As explained if further detail below, disk map module 32 may allocate cache lines of cache 34 on a per flow basis. In particular, cache lines of cache 34 are utilized such that each "packet flow" is given its own cache line. In general, a packet flow is a stream of packets having common source and destination information. For example, packet flows are typically identified by analyzing a five-tuple associated with received packets, i.e., source address, source port, destination address, destination port and protocol. Packets have the same five-tuple may be classified as belonging to the same packet flow. Packet flows may be classified using more or less granularity.

All cache lines written to disk 36 may be linked via pointers, such that when the end of one line is reached, there is a pointer to the next line on disk where the next packet for this tunnel or flow can be found. Similarly, the lines are linked in the reverse direction, so that the beginning of every line includes a pointer to the end of the previous line where the previous packet for this tunnel or flow is stored. The lines on disk 36 also include a length to indicate exactly how many bytes of data are actually in this cache line (i.e., the remaining non-data bytes may be used for the line header or for padding at the end of the line).

Disk map module 32 also operates as the interface to all read and write operations to disk 36. Disk map module 32 internally loads cache lines from disk 36 to cache 34 and flushes them back to disk 36 as necessary. Disk map module 32 also ensures that when a cache line is accessed for write purposes that it is handled differently than reads. Cache lines may be loaded from disk 36 into cache 34 in either read-only or write-only mode. In one embodiment, a cache line opened for read-write is retained independently in cache 34, and is not purged from cache 34 until its write operations are complete. Once all writes to the cache line have been completed by compression device 14, the cache line is then converted to read-only mode by writing its contents to its specific location on disk 36. At this point the cache line is then entered into a least recently used (LRU) queue of cache 34 with all the other read-only cache lines.

When a new cache line is needed in memory, the read-only cache line at the tail of the LRU queue is selected and removed from the tail. The data in this read-only cache line does not need to be written to disk 36, since it has never been written or modified from the time that the cache line was first read from disk 36 or converted into a read-only line from a read-write line. If the new cache line is a read-write cache line, then it is maintained independently by disk map module 32 until all writes are completed. If the new cache line is for read-only purposes, then it is added to the head of the cache line LRU queue.

When a location on disk 36 needs to be accessed for reading, disk map module 32 first checks mapping table 38 to see if the line containing this location on disk 36 is already in cache 34. If so, then the cache line in cache 34 is used to read this location. If not, then a new cache line is created by re-using the oldest cache line at the tail of the LRU queue and moving it to the head of the queue. The data from the line on disk 36 is read into the cache line in cache 34, and then the location is accessed from cache 34.

When a location on disk 36 is accessed for writing, disk map module 32 first checks mapping table 38 to see if the cache line containing this location on disk 36 is already in cache 34 in read-write mode. If so, disk map module 32 writes to the location in cache 34. If not, a new cache line is created (i.e., allocated) by re-using the oldest cache line at the tail of the LRU queue. In some embodiments, disk map module 32 assumes that no data needs to be read into this newly created cache line since a write to any location within the cache line is going to overwrite the entire cache line on disk 36. Disk map module 32 does not enter this newly created cache line to the head of the LRU queue, but rather gives a pointer to this cache line to the requesting compression or decompression device. This ensures that the cache line never gets pushed out of the LRU queue as long as it is still being written to by the compression or decompression device.

The basic pattern detection and encoding algorithm will now be described. Every packet received at compression device 14 is first assigned to a logical decompression tunnel based on its destination address. In other words, compression device 14 assigns the packet to a decompression tunnel based on the particular decompression device for which the packet is destined. Compression device 14 then checks whether it already has a current disk block assigned to this tunnel, and whether it already has a cache line opened for read-write from this disk block. If there is no disk block available, compression device 14 first requests a new disk block from disk map module 32, and then asks disk map module 32 to open the first line in this disk block for read-write access. If a disk block and a read-write cache line are already open, then disk map module 32 checks whether there is enough room in this cache line to store the new packet's data. If the cache line does not have enough space for storing this new packet data, then the current cache line is closed for read/write by telling disk map module 32 to convert it into read-only mode. As described earlier, this process writes the cache line content to disk 36 and adds the cache line pointer to the head of the LRU queue. Then disk map module 32 is asked to create a new read-write cache line and load the next consecutive line from the current disk block into this cache line. If data has been written to all cache lines in the current disk block, then the disk block is closed and a new disk block is assigned to this tunnel. The first line of this new disk block is then loaded into cache 34 in read-write mode as described above.

Once a disk block and an available cache line are ready, the packet data is written to this cache line. Disk map module 32 then applies a hash function to compute a signature for every S bytes in this input data. In particular, disk map module 32 applies a sliding window of width S bytes to the packet data and computes a signature for each window. Disk map module 32 then moves the window forward by one byte and the signature is computed again. In order to make this process efficient, an incremental signature calculation scheme may be used that allows for the re-calculation of the signature after moving the window forward by one byte. Hence, each time the window is moved forward by one byte, the new signature can be calculated based on a simple equation using the previous signature and the first and last byte in the new window. In one embodiment, the signature width, S, is chosen to be 32 bytes. The number of bits in the signature can also be chosen based on the signature requirements. In this embodiment the signature is chosen to have 64 bits.

In one embodiment, the signature function also incorporates the unique tunnel ID into its calculation so that the same data destined for different locations (i.e., different decompression devices) generates different signatures. Hence, from the point of view of the pattern detection algorithm, they appear logically to be different patterns, reflecting the fact that the data may not necessarily be cached by all decompression devices.

Once the signatures for all bytes have been computed, disk map module 32 selects some subset of these signatures based on their values. For instance, the selection criterion could be all signatures that end with some specific sequence of bits. For example, the selection criterion could be all signatures that end with six zeros (in binary form). This example would result in approximately one out of every 64 signatures for a given packet being selected. This deterministic signature selection scheme is based on the data in the packet and not on the location of the signatures in disk 36. Hash table 40 stores the selected signatures along with the location on disk 36 of the data having that signature.

After generating the signatures for a received packet, disk map module 32 passes each signature to hash table 40 to determine whether there was any previously received data that resulted in the same signatures. If so, hash table 40 returns the exact location on disk 36 where this previous signature was found. The current signature and the location of the current signature (i.e., the current disk block number and byte offset) are also added to hash table 40. In one embodiment, hash table 40 only keeps a single pointer for each signature. Eventually, however, hash table 40 will be full, and signatures will be re-used. In this embodiment, when the same signature is used multiple times, only the latest location is stored in hash table 40. Also, if there is a collision where two signatures map to the same hash table bin, only the latest signature location is stored by hash table 40. Hence, for each new selected signature in the current packet, the process of searching hash table 40 also adds the current signature into hash table 40 with a pointer to the current disk block and byte offset.

In another embodiment, hash table 40 stores multiple signature locations per hash table bin. In this case, each entry in hash table 40 provides a pointer to the exact location of where this signature occurred previously on disk 36. This pointer may include a disk block number and a byte offset in that disk block. Hash table 40 can store zero to all of the signature bits to differentiate between different signatures mapping to the same hash bin. As the number of bits of the signature that are stored in hash table 40 increases, the probability of finding an incorrect signature match due to a hash table collision decreases, but the memory requirement per hash table entry increases. The mapping of signatures to hash bins may be done as a modulus operation or as a masking operation.

For each potential signature match found by hash table 40 for a given inbound packet, disk map module 32 reads corresponding data from the specified location of disk 36 to determine whether there is an actual match with the data at the location of the same signature in the current packet. If there is a match between the packet data and the stored data, then the match is extended in both directions on either side of that particular location as far as possible until data is found that no longer matches, or until the end or beginning of the current inbound packet is reached. In this manner, all of the potential matches are processed to find the maximum length strings in the current packet that can be matched to previously received data currently stored on disk 36. The entire matched region of the current packet is replaced with a reference (e.g., a pointer) to the location where the previously received data is stored on disk 36. In one embodiment, each pointer includes the matching disk block number, the location within the disk block where the match starts, and the length of the match.

The disk block numbers used for the compression pointers correspond to a common number used by both compression device 14 and decompression device 16 on either side of WAN 15. This common number can be selected based on a simple protocol that assigns numbers on both ends of the tunnel in a round robin fashion. In one embodiment, the pointers may themselves be compressed by encoding them as differences from previous pointers. As described earlier, decompression device 16 informs compression device 14 far in advance that a disk block will soon be deleted and rewritten. This process guarantees that any disk block referred to by compression device 14 does indeed exist with the same data on the corresponding decompression device 16.

In one embodiment, disk map module 32 periodically stores disk map values and the contents of hash table 40 on disk 36 so that the data learned and stored by compression device 14 (or decompression device 16) may be retained even after the device is rebooted and any memory-based information is lost. This may be done by ensuring that every time the device is turned on, disk map module 32 first reads the latest version of the disk map information and hash table entries that were previously saved on disk 36. This may be done on both compression device 14 and decompression device 16 when they synchronize disk block information to ensure that the devices share the same information about what data has been seen previously and is currently stored.

In general, the processes described above, including disk mapping, pattern detection, cache management and packet compression/decompression, may be implemented as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functions of the processes may be implemented by executing the instructions of the computer-readable medium with one or more processors, discrete hardware circuitry, firmware, software executing on a programmable processor, or a combination of any of the above.

Figure 3:
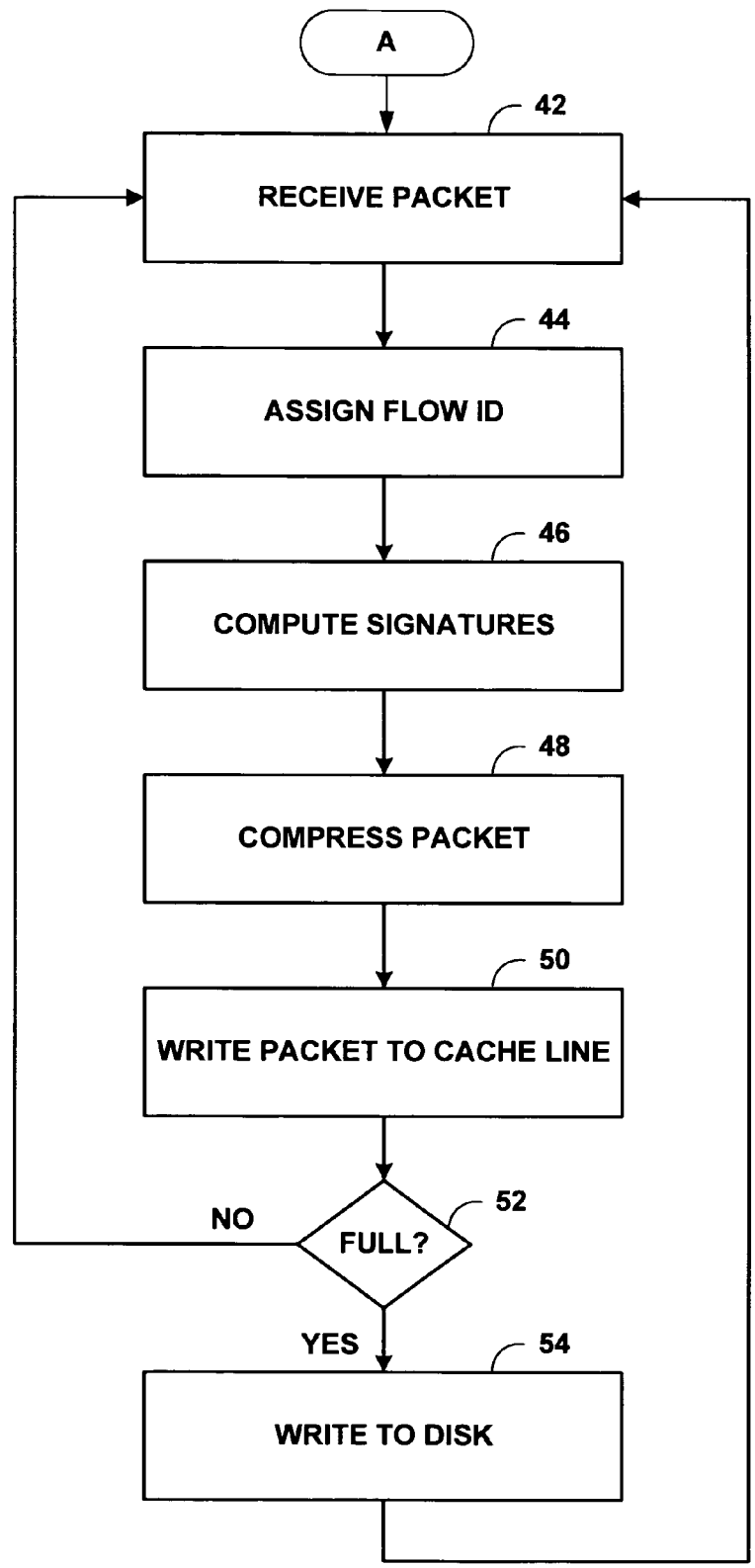
FIG. 3 is a flowchart illustrating exemplary operation of a compression device in accordance with the principles of the invention.

FIG. 3 is a flowchart illustrating exemplary operation of compression device 14 in accordance with the principles of the invention. The techniques described above may be enhanced in a number of ways to provide more efficient operation of the compression and decompression process.

For example, the principles of the invention may also be applied as follows to multiple traffic flows received at the same time. For example, referring to FIG. 1, application service provider 12 may simultaneously provide services to each of subscribers 18A-18C. Application service provider 12 may send a stream of packets comprising a video to subscriber 18A, while at the same time, application service provider 12 sends a different stream of packets comprising a different video to subscriber 18B. Packets from one flow (e.g., packets from application service provider 12 to subscriber 18A) may arrive interspersed with packets from another flow (e.g., packets from application service provider to subscriber 18B). If compression device 14 and decompression device 16 were to write the packets to disk 36 in the same order as the packets arrived, the flows would be intermingled within cache lines of cache 34 and within disk 36, thereby possibly resulting in poor cache locality.

To remedy this, when compression device 14 receives a packet from application service provider 12 (42), compression device 24 assigns a flow identifier (ID) for the packet. As discussed above, the flow ID may be determined based on the source and destination addresses, source and destination ports, protocol, other packet characteristics, or any combination thereof (44). In this manner, disk map module 32 assigns packets from the same flow the same flow ID. Disk map module 32 then utilizes cache lines of cache 34 in such a manner that each flow ID is assigned to its own cache line. This one-to-one mapping between packet flows and cache lines ensures that when packets are written to cache 34 and ultimately to disk 36, the packets from the same flow are clustered together. This technique may provide better data locality for both cache 34 and disk 36.

One implication of this process is that the compression and decompression devices 14, 16 may maintain multiple "open" read-write cache lines for every active packet flow. When a new packet arrives, the packet is added to the cache line corresponding to the packet's flow ID if there is room in the corresponding cache line. If not, disk map module 32 flushes the cache line for this flow ID to disk 36 and creates a new cache line for this flow ID. These steps are repeated on decompression device 16 so that the devices assign all packets to the same data flows in the same order, and are thereby written to disk 36 at exactly the same locations on both devices.

After compression device 14 assigns a flow ID to a received packet, signatures are computed for the packet, as described above (46). Assuming that the packet has not been previously seen and is not currently stored, the packet is compressed (48) and written to a cache line in cache 34 according to its flow ID (50). If the cache line is full (52), disk map module 32 writes the packet to disk 36 (54) and continues to process the next inbound packet.

Figure 4:
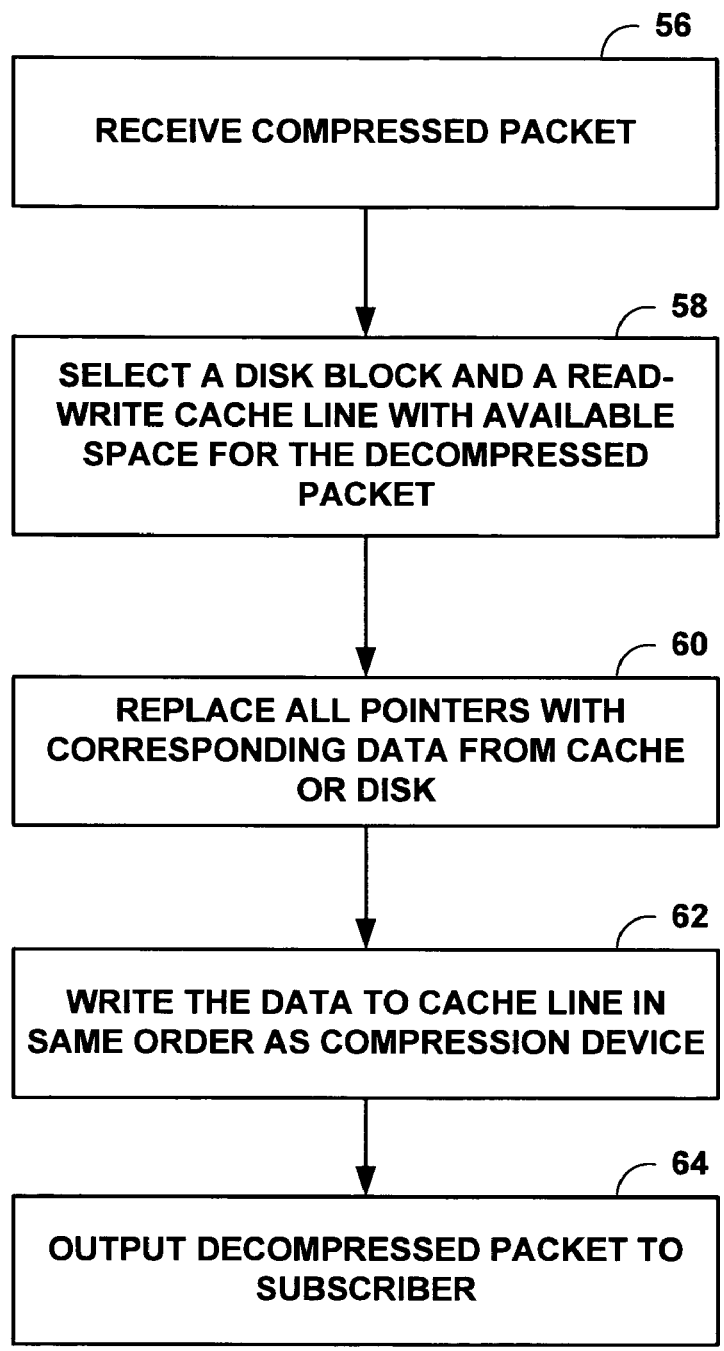
FIG. 4 is a flowchart illustrating exemplary operation of a decompression device in accordance with the principles of the invention.

FIG. 4 is a flowchart illustrating exemplary operation of decompression device 16 in accordance with the principles of the invention. Decompression device 16 receives a compressed packet from compression device 14. This compressed packet may, for example, include actual data, references to previously cached data, or a combination thereof. Decompression device 16 passes the data in the packet through the same process described above with respect to compression device 14 in order to select a disk block and a read-write cache line with available space for the decompressed packet (58).

Decompression device 16 then parses the compressed data and replaces any pointers with the corresponding data from its cache 34, or from disk 36 if disk map module 32 of the decompression device has not already loaded the data into cache 34 (60). This is done using disk map module 32 to write the data to cache 34 from disk 36 as necessary in the same order as compression device 14 to decompress the packet (62). Once the packet is decompressed, decompression device 16 outputs the packet to the destination subscriber 18 in the same form as it existed before compression (64).

Figure 5:
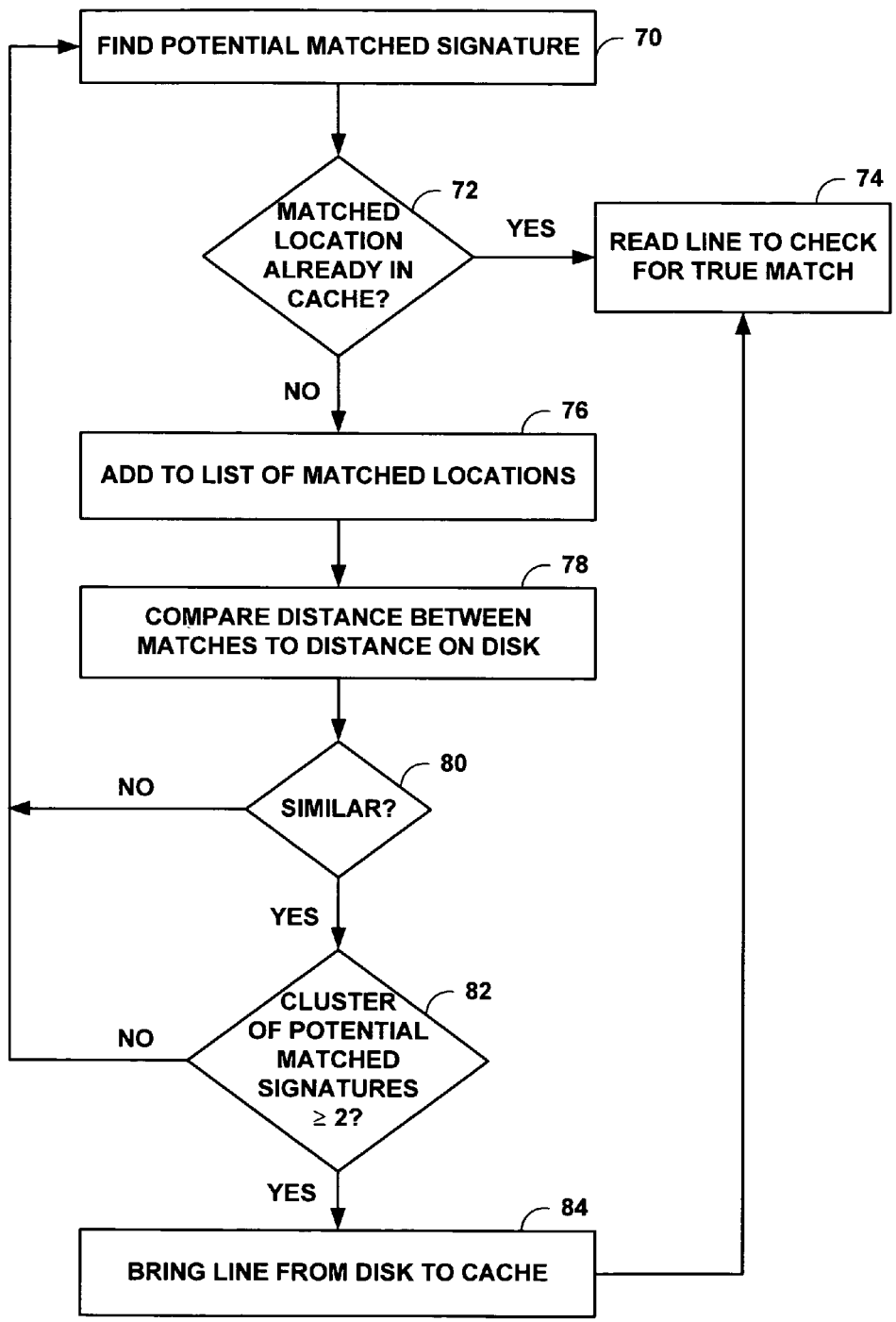
FIG. 5 is a flowchart illustrating exemplary operation of a compression device in clustering potential matched signatures before going to a disk to read data.

FIG. 5 is a flowchart illustrating exemplary operation of compression device 14 when determining whether a match occurs between inbound packet data and data previously written to cache 34 and disk 36. In particular, FIG. 5 illustrates compression device 14 using a signature clustering algorithm to determine whether a match exists before accessing disk 36 to read and verify the previously stored data.

Upon receiving a packet, compression device 14 examines the packet to computer signatures (as described above) and determines whether any of the signatures match signatures for data previously stored on disk 36 (70). For example, compression device 14 queries hash table 40 to determine whether any of the signatures for the current inbound packet match any previously generated signatures. In general, hash table 40 associates each signature with a respective location on disk 36 having data from which the signature was generated. A packet may contain multiple signatures that are potential matches to different locations on disk 36. In the case where hash table 40 only maps one location to each signature, the same signature may have been used multiple times for different locations on disk. Consequently, disk map module 32 checks the signature locations on disk 36 to verify that the data in the packet is the same as the data at the signature location on disk 36. If it is the same, compression device 14 can replace the matched data in the packet with a pointer to the location on disk 36. As a result, compression device 14 need not re-send the matched data over WAN 15, since decompression device 16 will have the matched data in its disk 36.

To check the data, disk map module 32 first consults mapping table 38 to determine whether the line corresponding to the matched location is already in cache 34 (72). If the matched data is in cache 34, disk map module 32 reads the line of data in cache 34 to check whether the data the data in cache 34 matches the data in the packet (74). If the data matches, the match is "extended" on both sides as far as possible, as described above.

If the line corresponding to the matched location is not already in cache 34, disk map module 32 may check the data in disk 36 to determine whether the signature is a true match. However, since accessing disk 36 to match a string of data is an expensive and slow operation, in one embodiment, disk access is only be performed when there is a high confidence that the data match is likely to be true and that the data around this matched location is likely to be accessed soon to match future packets. Disk map module 32 achieves the high level of confidence by "clustering" all of the matched signatures in a received packet and only accessing disk 36 if there is a cluster of adequate size.

More specifically, after determining that the matched location is not in cache 34, disk map module 32 adds this location to a list of potential matched locations (76). The list of potential map locations is "clustered" as follows. The clustering algorithm processes all of the disk locations in the list and measures the distance between these locations in the packet. It also computes a "logical distance" between these locations in disk 36. The clustering algorithm then compares the distance between the locations in the packet to the distance between the locations on the disk (78). If the distances between the signatures of the inbound packet and the distances between the signatures within the disk are substantially similar (i.e., within a threshold tolerance or distance), then it is very likely that the potential matches on disk are accurate matches. In contrast, if the signatures in the packet are all separated by 100 bytes, for example, while the corresponding potential matches on disk are separated by 100 Mbytes, then the potential matches will probably not result in a true match and may not be worth reading from disk. An administrator may set a threshold distance required for the matches on disk to be considered "similar" to the distance on the packets. As one example, the threshold distance may be set such that the matches on disk must be separated by less than the total size of the current packet. The clustering of the potential matches may also be done using the location of previous potential matches to further increase the confidence that the current potential matches will result in a true match.

If the distances are not similar (80), the clustering algorithm continues to find matched signatures in the packet and adds them to the list of matched locations if they are not already in cache 34. If the distances are similar, the clustering algorithm then determines whether there is a sufficient "cluster," or number, of potential matches within the same relative distance as the corresponding locations on disk 36 (82). For example, this threshold number may be set at two. In this case, if there are at least two potential matches on disk that are within the same relative distance as the corresponding signatures in the packet, the line will be brought from disk 36 to cache 34 (84), and the cache line will be read to determine whether the match is true, i.e., that the data in the packet is the same as the data at the signature location on disk 36 (74). If it is the same, compression device 14 can replace the matched data in the packet with a pointer to the location on disk 36. As a result, compression device 14 need not re-send the matched data over WAN 15, since decompression device 16 will have the matched data in its disk 36.

By setting the minimum cluster size at two, compression device 14 can also avoid the need to store any signature bits in hash table 40 to avoid collisions, since it is extremely unlikely that two hash table collisions will point to two locations on disk 36 that are clustered together in a similar relative distance as the signatures in the current packet. Other minimum cluster sizes or relative distance requirements may be used.

This clustering scheme for determining which potential matches should be read from disk need not necessarily be performed by decompression device 16, since decompression device 16 typically reads every location on disk that is referred to in the compressed packet.

Figure 6:
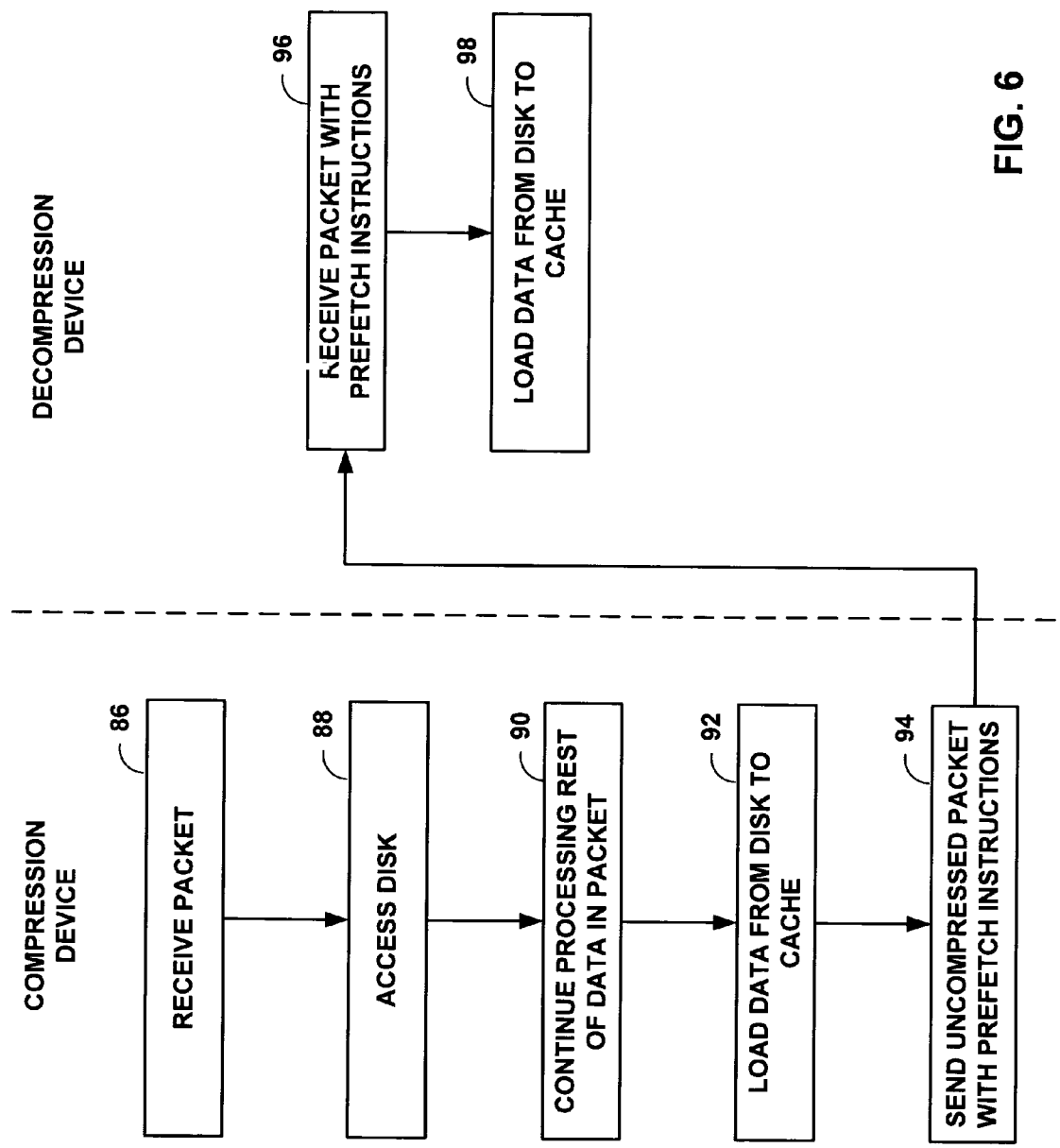
FIG. 6 is a flowchart illustrating exemplary operation of compression and decompression devices in pre-fetching lines from a disk.

FIG. 6 is a flowchart illustrating exemplary operation of one embodiment of compression device 14 and decompression device 16 in which cache lines are pre-fetched from disk 36 (FIG. 2) to further reduce disk access time. For example, in some situations the performance of system 10 (FIG. 1) may be limited by the time it takes disk map module 32 to bring up a cache line from disk 36 to cache 34. By taking advantage of the increased cache locality resulting from the use of flow IDs, as described above with respect to FIG. 3, system 10 can further improve performance by prefetching cache lines from disk 36.

For example, when compression device 14 receives a packet that generates a cache miss and requires an access to disk 36 (86), disk map module accesses disk 36 to retrieve the required cache line (88). However, instead of waiting for the line to load to cache 34, disk map module 32 continues processing the rest of the data in the packet (90), before the data is loaded from disk 36 to cache 34 (92). In other words, disk map module 32 may not wait for cache 34 to load, but may instead output an uncompressed packet in parallel with the cache loading.

Disk map module 32 takes advantage of the fact that the next packet that compression device 14 receives will likely not require a disk access, because the data will already be in cache 34 due primarily to the fact that packet flows were originally stored to the same cache line. Thus, there is an increased probability that packets received after the cache miss occurs will be contained within the cache line retrieved from disk 36.

For this reason, when compression device 14 sends the initial uncompressed packet to decompression device 16 (i.e., the packet that generated the cache miss), the packet contains instructions and pointers directing decompression device 16 to prefetch data from a particular location from its internal disk 36, even though compression device 14 has not compressed the packet (94). Normally, when a packet has not been compressed, decompression device 16 will not have to load any data from disk 36. However, in this embodiment, when decompression device 16 receives the packet with the prefetch instructions (96), the decompression device nevertheless loads the data from disk 36 to cache 34. Consequently, when decompression device 16 receives packets in the future that are compressed, and thus would require a disk access to a nearby region, the data may already be located in cache 34 because the data was prefetched by decompression device 16. In this manner, performance of system 10 may be further increased by the use of long distance pre-fetch instructions between compression device 14 and decompression device 16.

Figure 7:
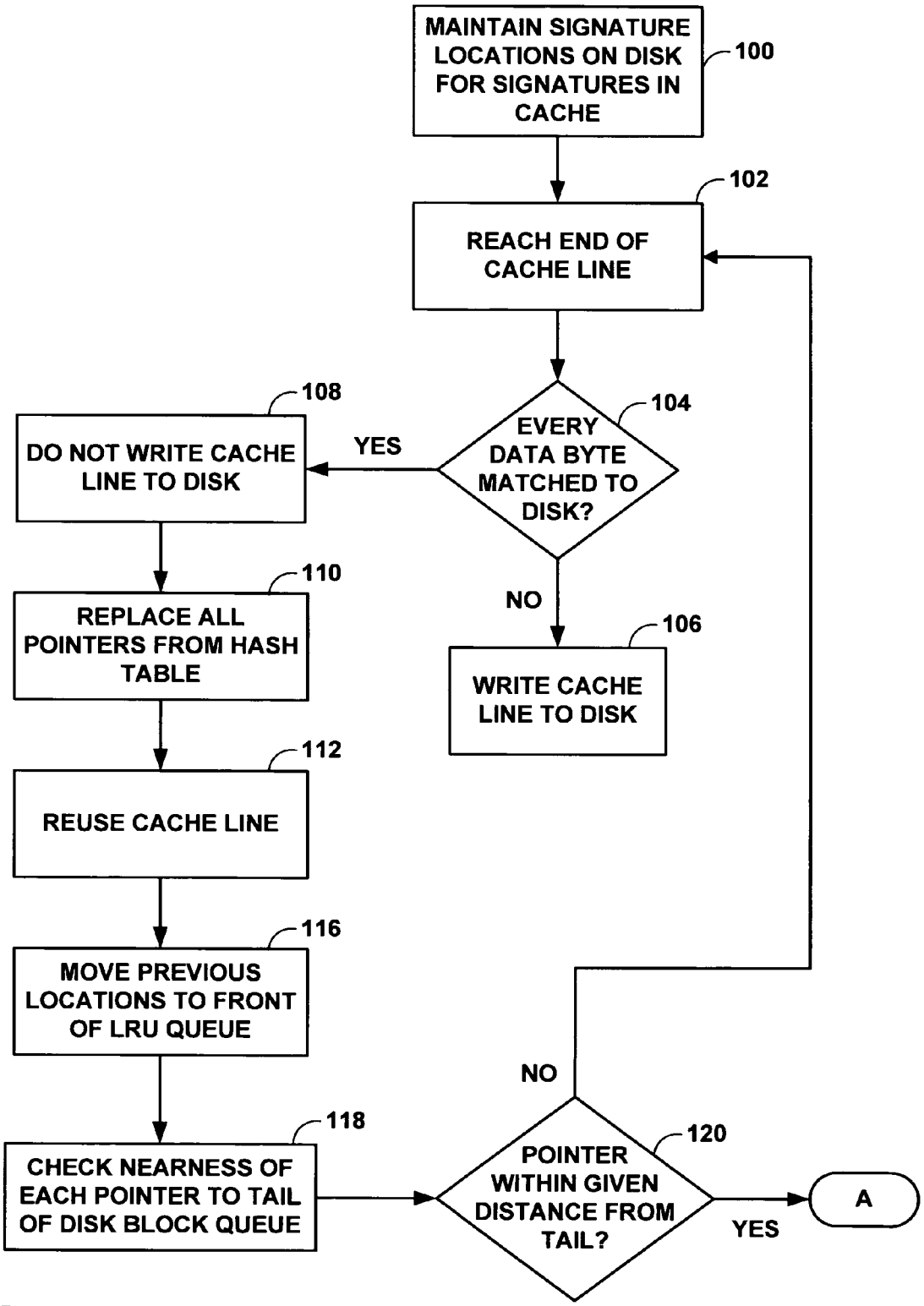
FIG. 7 is a flowchart illustrating exemplary operation of a compression device implementing an optimization technique for writing cache lines from a cache to a disk only when the cache lines contain new data.

FIG. 7 is a flowchart illustrating exemplary operation of compression device 14 implementing an optimization technique for writing cache lines from cache 34 to disk 36 only when the cache lines contain new data. As illustrated in FIG. 7, only cache lines containing new data are written to disk 36, and cache lines whose entire contents have been matched to previous bytes are not written to disk 36. In other words, even though a cache line may be considered "dirty" in that data from one or more inbound packets has been written to the cache line and not yet flushed, the cache line may nevertheless be discarded if disk map module 32 determines that all of the data written to the cache line matches data previously stored to disk 36.

In this embodiment, for every selected signature in a cache line, compression device 14 maintains a corresponding location of the same signature in the matched region on disk 36 (100). When the end of the cache line is reached, i.e., no more space is left in the cache line for adding a new packet (102), compression device 14 checks whether every data byte in the cache line has been matched to some data bytes that are already on disk 36 (104). If not, then the current cache line is written to disk 36 (106). If so, then the current cache line does not need to be written to disk 36 (108), since all of the data contained in the cache line is already present on disk 36.

Since the cache line will not be written to disk 36, all pointers from hash table 40 to the current cache line are replaced with equivalent pointers to the corresponding locations on the disk 36 that were previously generated (110). This may be done by using the list of corresponding pointers to previous matched locations for every selected signature in the current cache line. Once these pointers have been replaced with pointers to the same string earlier on disk, compression device may reuse current cache line for a new packet having the same flow ID (112).

Additionally, since all pointers to the current cache line have been replaced with pointers to previous locations, if any of these previous locations are currently in cache 34, they are moved to the front of the cache's LRU queue (116). Furthermore, since the disk blocks being pointed to will eventually reach the tail of the disk-block queue, at some point the current cache line should not be reused without being written to disk. This may be accomplished by checking the nearness of each pointer to the tail of the disk-block queue (118). If any pointer is within some given distance to the tail (120) then the process may revert to step 42 of FIG. 3, and compression device 14 will write the cache line to disk 36 when the cache line is full. If the pointer is not within the given distance to the tail (120), compression device 14 continues to operate using this optimization technique.

This optimization technique may be made even more effective by using the flow ID scheme described above with respect to FIG. 3, since multiple interleaved flows sending the same data to the same destination will probably be separated into different cache lines.

In another embodiment, the invention may be used for compressing files, storage data, backup files, or archives. In this embodiment, the compression and decompression devices would not operate synchronously on packets, and would instead operate asynchronously on files or archives saved on disk. In other words, the compression device would use this invention to find and compress patterns and save the resulting compressed data in some permanent format. The decompression device could then, at some later time, process the compressed data to regenerate the original data as needed.

Various embodiments of the invention have been described. These and other embodiments are within the scope of the following claims.

The invention claimed is:

1. A method comprising:
   maintaining a cache within a compression device, wherein the cache includes a plurality of cache lines and each of the cache lines is associated with a packet flow identifier;
   receiving a packet with the compression device;
   assigning a flow identifier to the packet;
   selecting one of the cache lines of the cache based on the flow identifier;
   writing the packet to the selected cache line;
   comparing data of the packet to data stored on a storage medium of the compression device to determine whether at least a portion of the data in the received packet matches data previously received by the compression device;
   modifying the packet by inserting one or more pointers to storage locations of the storage medium upon detecting a match; and
   transmitting the modified packet to a decompression device.

2. The method of claim 1, wherein modifying the packet comprises:
   modifying the packet by replacing a pattern within the data in the packet with the one or more pointers when the pattern within the data in the received packet matches a pattern of data on the storage medium.

3. The method of claim 1, wherein the pointers include a disk block number, a location within the disk block where the pattern starts, and a length of the pattern.

4. The method of claim 1, wherein comparing the data comprises:
   generating signatures for data in the packet;
   mapping the signatures to the storage locations on the storage medium; and
   comparing the data of the packet with data at the storage locations of the storage medium.

5. The method of claim 4, further comprising:
   identifying a set of the signatures generated from the previously received data that matches the signatures generated from the packet data; and
   retrieving data from the storage medium when a logical distance separating the locations within the storage medium associated with the set of signatures is below a threshold distance.

6. The method of claim 5, wherein retrieving data comprises storing the data from the storage medium to the cache when the logical distance is below the threshold distance.

7. The method of claim 5, wherein the threshold distance is the size of the packet.

8. The method of claim 4, further comprising:
   selecting a subset of the signatures; and
   saving the subset of signatures to a hash table, wherein the hash table associates each of the signatures with corresponding locations on the storage medium.

9. The method of claim 4, wherein mapping the signatures comprises searching a hash table of signatures generated from the data previously received by the compression device, wherein the hash table associates each of the signatures of the data with a disk block number and a byte offset storing the data from which the signature was generated.

10. The method of claim 1, further comprising:
    detecting when one of the cache lines is full with packet data;
    determining whether all of the packet data written to the cache line matches the data previously received by the compression device and stored on the storage medium; and
    reusing the cache line without writing the cache line to the storage medium when a match occurs for all of the packet data written to the cache line.

11. The method of claim 10, further comprising:
    replacing pointers to the memory with equivalent pointers to corresponding locations on the disk;
    moving the equivalent pointers to a front of a least recently used (LRU) queue of the memory; and
    checking a distance of one of the equivalent pointers to a tail of a disk-block queue.

12. The method of claim 1, further comprising
    accessing the cache to compare the portion of the data in the received packet with the data previously received by the compression device and stored on the storage medium;

generating a cache miss when the data of the packet is not found within the cache;

in response to a cache miss, sending a prefetch instruction from the compression device to the decompression device, wherein the prefetch instruction directs the decompression device to load data from a storage medium within the decompression device for use in decompressing subsequent packets received from the compression device.

13. The method of claim 12, further comprising modifying the packet to include the prefetch instruction.

14. The method of claim 13, further comprising sending the packet in uncompressed format to the decompression device in response to the cache miss.

15. The method of claim 14, further comprising:

in response to the cache miss, retrieving data from the storage medium of the compression device for storage in the cache for compression of the subsequent packets; and sending the packet in uncompressed form concurrently with the loading of the cache within the compression device.

16. The method of claim 1, further comprising:

receiving the modified packet with the decompression device;

retrieving data from a storage medium within the decompression device;

recreating the packet in unmodified form using the retrieved data; and outputting the recreated packet from the decompression device.

17. The method of claim 16, wherein retrieving data comprises retrieving the data from a cache within the decompression device.

18. The method of claim 16, further comprising:

prior to receiving the modified packet, receiving with the decompression device a prefetch command; and prefetching data from the storage medium within the decompression device in response to the prefetch command.

19. The method of claim 1, further comprising storing the data from the cache to the storage medium when a cache line associated with the flow identifier is full.

20. The method of claim 1, wherein assigning a flow identifier to the packet comprises selecting the flow identifier based on a source address, a destination address, a source port, a destination port, or a protocol associated with the packet.

21. The method of claim 1, further comprising maintaining a mapping table that identifies data on the storage medium that is currently located in the cache.

22. A compression device comprising:

a storage medium that stores data previously received by the compression device;

a cache that stores a subset of the data stored on the storage medium, wherein the cache includes a plurality of cache lines and each of the cache lines is associated with a packet flow identifier; and a mapping module that assigns a flow identifier to a received packet and writes the received packet to the cache based on the flow identifier, wherein the mapping module generates signatures for data of a packet received by the compression device and detects a pattern within the data of the packet that matches at least a portion of the data stored on the storage medium based on the signatures, and wherein upon detecting a match the mapping module modifies the packet by replacing the pattern with a pointer to a storage location of the storage medium and transmits the modified packet to a decompression device.

23. The compression device of claim 22, wherein the mapping module identifies a set of the signatures generated from the previously received data that matches the signatures generated from the packet data and retrieves data from the storage medium when a logical distance separating the locations within the storage medium associated with the set of signatures is below a threshold distance.

24. The compression device of claim 23, wherein the mapping module stores the data from the storage medium to the cache when the logical distance is below the threshold distance.

25. The compression device of claim 23, wherein the threshold distance is the size of the packet.

26. The compression device of claim 22, further comprising a hash table that associates each of the signatures with corresponding locations on the storage medium, wherein the mapping module selects a subset of the signatures and saves the subset of signatures to the hash table.

27. The compression device of claim 22, further comprising a hash table that associates each of the signatures of the data with a disk block number and a byte offset storing the data from which the signature was generated, wherein the mapping module searches the hash table for signatures generated from the previously received data.

28. The compression device of claim 22, wherein the mapping module detects when one of the cache lines is full with packet data and determines whether all of the packet data written to the cache line matches the data previously received and stored on the storage medium; and wherein the mapping module reuses the cache line without writing the cache line to the storage medium when a match occurs for all of the packet data written to the cache line.

29. The compression device of claim 22, wherein the mapping module accesses the cache to compare a portion of the data in the received packet with the data previously received and stored on the storage medium, and generates a cache miss when data of the packet is not found within the cache;

wherein in response to a cache miss, the mapping module sends a prefetch instruction from the compression device to the decompression device, wherein the prefetch instruction directs the decompression device to load data from a storage medium within the decompression device for use in decompressing subsequent packets received from the compression device.

30. The compression device of claim 29, wherein the mapping module modifies the packet to include the prefetch instruction.

31. The compression device of claim 30, wherein the mapping module sends the packet in uncompressed format to the decompression device in response to the cache miss.

32. The compression device of claim 31, wherein the mapping module retrieves data from the storage medium for storage in the cache for compression of the subsequent packets in response to the cache miss and sends the packet in uncompressed form concurrently with the loading of the cache.

33. The compression device of claim 22, wherein the mapping module stores the data from the cache to the storage medium when a cache line associated with the flow identifier is full.

34. The compression device of claim 22, wherein the mapping module selects the flow identifier based on a source address, a destination address, a source port, a destination port, or a protocol associated with the packet.

35. The compression device of claim 22, further comprising a mapping table that identifies data on the storage medium that is currently located in the cache.

36. A system comprising:
a compression device having a storage medium containing data previously received by the compression device and a cache storing at least a portion of the data; and
a decompression device having a storage medium containing data previously received by the decompression device and a cache storing at least a portion of the data previously received by the decompression device,
wherein each of the caches includes a plurality of cache lines and each of the cache lines is associated with a packet flow identifier, and wherein the compression device and the decompression device assign a flow identifier to a received packet and write the packet to a cache line selected based on the flow identifier, wherein the compression device is configured to compare data of the received packet to data stored on the storage medium of the compression device to determine whether at least a portion of the data in the received packet matches data previously received by the compression device, modify the packet by inserting one or more pointers to storage locations of the storage medium upon detecting a match, and transmit the modified packet to the decompression device.

37. A computer-readable medium comprising instructions for causing a compression device to:
maintain a cache within the compression device, wherein the cache includes a plurality of cache lines and each of the cache lines is associated with a packet flow identifier;
receive a packet;
assign a flow identifier to the packet;
select one of the cache lines of the cache based on the flow identifier;
write the packet to the selected cache line;
compare data of the packet to data stored on a storage medium of the compression device to determine whether at least a portion of the data in the received packet matches data previously received by the compression device;
modify the packet by inserting one or more pointers to storage locations of the storage medium upon detecting a match; and
transmit the modified packet to a decompression device.

* * * * *